United States Patent
Kataoka et al.

(10) Patent No.: US 11,055,328 B2
(45) Date of Patent: Jul. 6, 2021

(54) NON-TRANSITORY COMPUTER READABLE MEDIUM, ENCODE DEVICE, AND ENCODE METHOD

(71) Applicant: FUJITSU LIMITED, Kawasaki (JP)

(72) Inventors: Masahiro Kataoka, Kamakura (JP); Ryo Matsumura, Numazu (JP); Takaki Ozawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 15/926,077

(22) Filed: Mar. 20, 2018

(65) Prior Publication Data
US 2018/0285443 A1  Oct. 4, 2018

(30) Foreign Application Priority Data

Mar. 29, 2017  (JP) .............................. JP2017-065743

(51) Int. Cl.
*G06F 16/31* (2019.01)
*G06F 16/33* (2019.01)

(52) U.S. Cl.
CPC ........ *G06F 16/316* (2019.01); *G06F 16/3344* (2019.01)

(58) Field of Classification Search
CPC .. G06F 16/2228; G06F 16/316; G06F 16/334; G06F 16/2237; G06F 16/245; G06F 16/137; G06F 16/3344
See application file for complete search history.

(56) References Cited

U.S. PATENT DOCUMENTS

| | | | |
|---|---|---|---|
| 5,329,598 A | 7/1994 | Geist | |
| 5,745,745 A | 4/1998 | Tada | |
| 5,748,953 A * | 5/1998 | Mizutani | G06K 9/62 |
| 8,160,402 B2 * | 4/2012 | Wu | G06K 9/723 |
| | | | 382/309 |
| 9,793,920 B1 * | 10/2017 | Kataoka | G06F 16/31 |

(Continued)

FOREIGN PATENT DOCUMENTS

| | | | |
|---|---|---|---|
| EP | 2579165 A1 * | 4/2013 | |
| JP | 5-14206 A | 1/1993 | |

(Continued)

OTHER PUBLICATIONS

Optimizing Druid with Roaring bitmaps. Chambi et al. ACM 2016.*
(Continued)

*Primary Examiner* — Daniel A Kuddus
(74) *Attorney, Agent, or Firm* — Fujitsu Patent Center

(57) ABSTRACT

A non-transitory computer readable medium storing a program that causes a computer to execute a process, the process including obtaining text data, generating first index information indicating appearance positions in the text data for each of a plurality of characters or words obtained based on lexical analysis of the text data, generating second index information, the second index information being index information in which the appearance positions in the text data are aggregated for each character or word, specifying a data range in the first index information, to be referred in a pattern match search by using the second index information, and performing encoding for the text data based on the pattern match search by using the data range in the first index information.

6 Claims, 13 Drawing Sheets

(56) References Cited

U.S. PATENT DOCUMENTS

| | | | |
|---|---|---|---|
| 2002/0005792 A1 | 1/2002 | Satoh | |
| 2003/0120642 A1 | 6/2003 | Egilsson et al. | |
| 2005/0086234 A1 | 4/2005 | Tosey | |
| 2009/0028445 A1* | 1/2009 | Wu | G06K 9/723 382/225 |
| 2009/0028446 A1* | 1/2009 | Wu | G06K 9/723 382/229 |
| 2009/0028777 A1* | 1/2009 | Zhamu | B82Y 30/00 423/448 |
| 2009/0228777 A1* | 9/2009 | Henry | G06F 16/40 715/230 |
| 2010/0257159 A1 | 10/2010 | Uematsu et al. | |
| 2013/0031133 A1 | 1/2013 | Adzic et al. | |
| 2014/0222852 A1* | 8/2014 | Yitshak | H04L 63/0245 707/758 |
| 2015/0113932 A1* | 4/2015 | Helgesen | F16H 7/0827 56/11.8 |
| 2016/0217207 A1* | 7/2016 | Okura | G06F 16/3344 |
| 2016/0364707 A1 | 12/2016 | Varma | |
| 2017/0103123 A1* | 4/2017 | Kataoka | G06F 16/325 |
| 2017/0200491 A1* | 7/2017 | Liaw | G11C 5/02 |
| 2017/0300491 A1* | 10/2017 | Kataoka | G06F 16/235 |
| 2017/0300507 A1* | 10/2017 | Kataoka | G06F 16/137 |
| 2018/0101553 A1* | 4/2018 | Nakamura | G06F 16/316 |
| 2018/0113932 A1* | 4/2018 | Kataoka | G06F 16/31 |
| 2018/0276260 A1* | 9/2018 | Kataoka | G06F 16/245 |
| 2019/0205297 A1* | 7/2019 | Deng | G06F 16/2228 |

FOREIGN PATENT DOCUMENTS

| | | |
|---|---|---|
| JP | 8-69476 A | 3/1996 |
| JP | 9-036747 | 2/1997 |
| JP | 10-283368 A | 10/1998 |
| JP | 11-85459 A | 3/1999 |
| JP | 2000-124810 A | 4/2000 |
| JP | 2009-048352 | 3/2009 |
| WO | 2009/066501 A1 | 5/2009 |

OTHER PUBLICATIONS

Fukushima, Sonosuke, "Algorithm of Film Compression Tool gzip", bit (Kyoritsu Shuppan), vol. 28, No. 3, pp. 30-37, Mar. 1996, English Translation (25 pages).
U.S. Office Action dated Jan. 10, 2020 for copending U.S. Appl. No. 15/680,247, 17 pages.
European Office Action dated Jun. 13, 2018 in European Patent Application No. 17188113.9, 7 pages.
Extended European Search Report dated Nov. 16, 2017 in Patent Application No. 17188113.9, 8 pages.
European Office Action dated Feb. 12, 2019 in corresponding European Patent Application No. 17188113.9, 7 pages.
U.S. Office Action dated Jul. 9, 2020 for copending U.S. Appl. No. 15/680,247, 31 pages.
Japanese Office Action dated Sep. 1, 2020 for corresponding Japanese Patent Application No. 2016-207216, with English Translation, 9 pages.
Japanese Office Action dated Mar. 9, 2021 for corresponding Japanese Patent Application No. 2017-065743 with th English Translation, 7 pages.

* cited by examiner

NON-TRANSITORY COMPUTER READABLE MEDIUM, ENCODE DEVICE, AND ENCODE METHOD

CROSS-REFERENCE TO RELATED APPLICATION

This application is based upon and claims the benefit of priority of the prior Japanese Patent Application No. 2017-65743, filed on Mar. 29, 2017, the entire contents of which are incorporated herein by reference.

FIELD

The embodiments discussed herein are related to a non-transitory computer readable medium, encode device, and encode method.

BACKGROUND

As a compression algorithm, ZIP that is a result of improving an LZ77 is currently predominant. In ZIP, a longest match character string to be compressed is searched using a sliding window, and a compressed code is generated. That is, in ZIP, in a case where the same character string as the character string to be compressed exists in data existing in the sliding window which is already compression-encoded, compression is performed by expressing a compressed code by a relative address and a length from the sliding window.

Japanese Laid-open Patent Publication Nos. 2009-048352 and 9-036747 are examples of the related art.

"Algorithm of film compression tool gzip" Fukushima, bit (KYORITSU SHUPPAN), Vol. 28, No. 3, pp. 30 to 37, March 1996 is an example of the related art.

SUMMARY

According to an aspect of the invention, a non-transitory computer readable medium storing a program that causes a computer to execute a process, the process including obtaining text data, generating first index information indicating appearance positions in the text data for each of a plurality of characters or words obtained based on lexical analysis of the text data, generating second index information, the second index information being index information in which the appearance positions in the text data are aggregated for each character or word, specifying a data range in the first index information, to be referred in a pattern match search by using the second index information, and performing encoding for the text data based on the pattern match search by using the data range in the first index information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, in a technology of the longest match search using a sliding window in the related art, there is a problem in that it is difficult to efficiently perform compression.

That is, in the longest match search using the sliding window, at the time when the longest match search, data is copied in advance to the sliding window and a hash table is generated. However, the size of the sliding window is limited to a certain value or less (for example, 64 kilobytes) so that a code length of a compressed code does not become too long. Accordingly, since the data overflowing from the sliding window is excluded from a subject of the longest matching, a compression ratio is lowered and it is difficult to efficiently compress the data. Furthermore, in the longest match search, it is desire to sequentially compare the actual data copied to the sliding window using the hash table, the compression speed decreases, it is difficult to efficiently compress the data.

Figure 1:
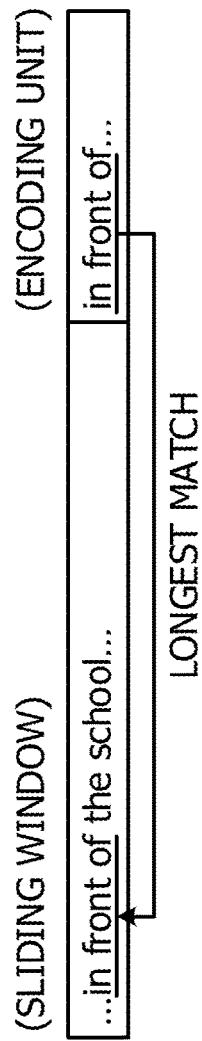
FIG. 1 is a diagram illustrating an encoding process using an LZ77 system.
Figure 1:
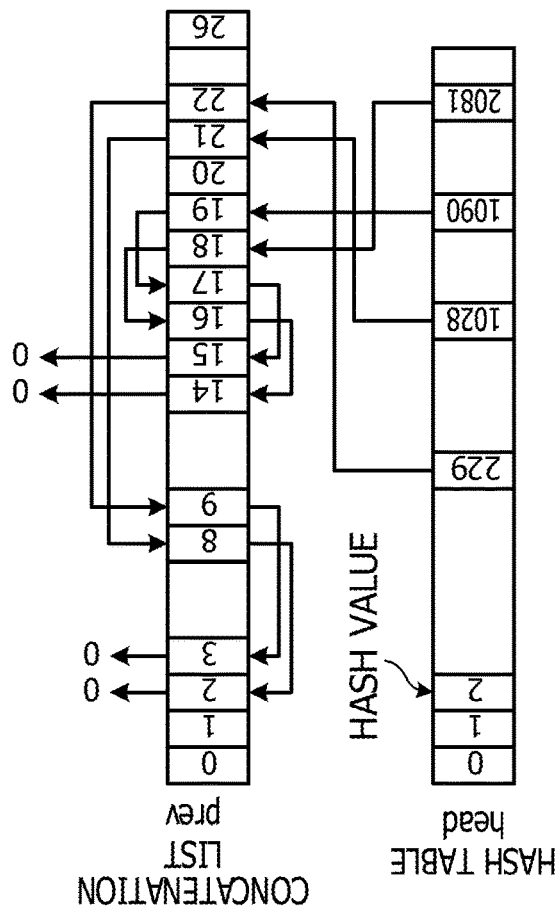
Figure 1:
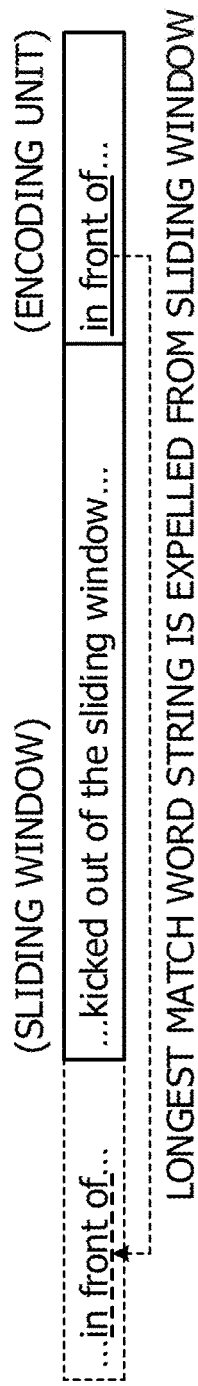

Here, in the technology of the longest match search using a sliding window in the related art, the problem that it is not possible to efficiently perform compression will be described with reference to FIG. 1. FIG. 1 is a diagram illustrating an encoding process using an LZ77 system. As illustrated in FIG. 1, an encoding unit, the sliding window, and the hash table are reserved, for example, in a memory.

In the encoding process, data of a compression target file (not illustrated) is loaded in the encoding unit. Then, the actual data that is already compressed and encoded is copied to the sliding window. In the encoding process, a compressed code is generated based on a data string (longest matching data string) that is most identical to the data of the encoding unit among the data included in the sliding window. The compressed code is information that is obtained by combining the matching length of the longest matching data string in the sliding window and the position within the sliding window.

In a case of the upper drawing of FIG. 1, in the encoding process, in a word string included in the sliding window, the word string "in front of" having the longest matching with the word string "in front of . . . " of the compression processing target in the encoding unit is assigned to one code.

In the encoding process, although the hash table is used to speed up the longest match search, since the data of the encoding unit is compared with the actual data that is copied to the sliding window, the compression speed decreases and it is difficult to efficiently compress data.

Furthermore, as illustrated in the lower drawing of FIG. 1, since contents of the data which has been subjected to the encoding process are sequentially copied to the sliding window, a situation in which "in front of" is expelled from the sliding window as the encoding process proceeds is generated. Therefore, despite the existence of "in front of . . ." of the compression processing target in the encoding unit, there may be a situation where the preceding "in front of" which is the longest match is expelled from the sliding window. In this situation, since the data overflowing from the sliding window is excluded from the subject of the longest matching, the compression ratio is lowered.

In one aspect, an object is to efficiently perform the longest match search of a character string or a word string in encoding.

According to one aspect, it is possible to efficiently perform the longest match search of a character string or a word string in encoding.

Hereinafter, an embodiment of a non-transitory computer readable medium storing an encoding program, an encoding device, and an encoding method disclosed in the present application will be described with reference to drawings. The present disclosure is not limited by the embodiment.

Embodiment

Encoding Process According to Embodiment

Figure 2:
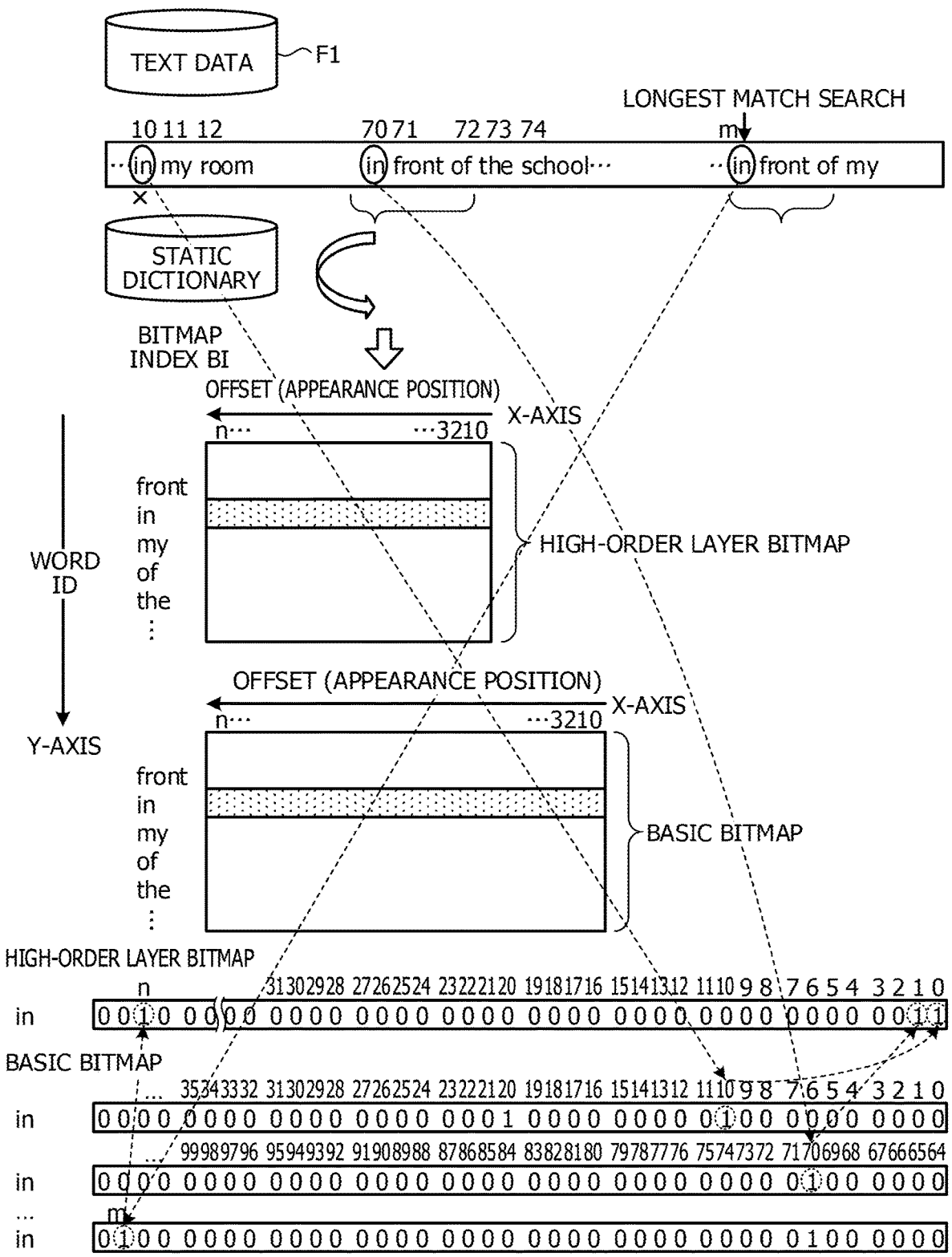
FIG. 2 is a diagram (1) illustrating an example of a flow of the encoding process according to an embodiment.
Figure 3:
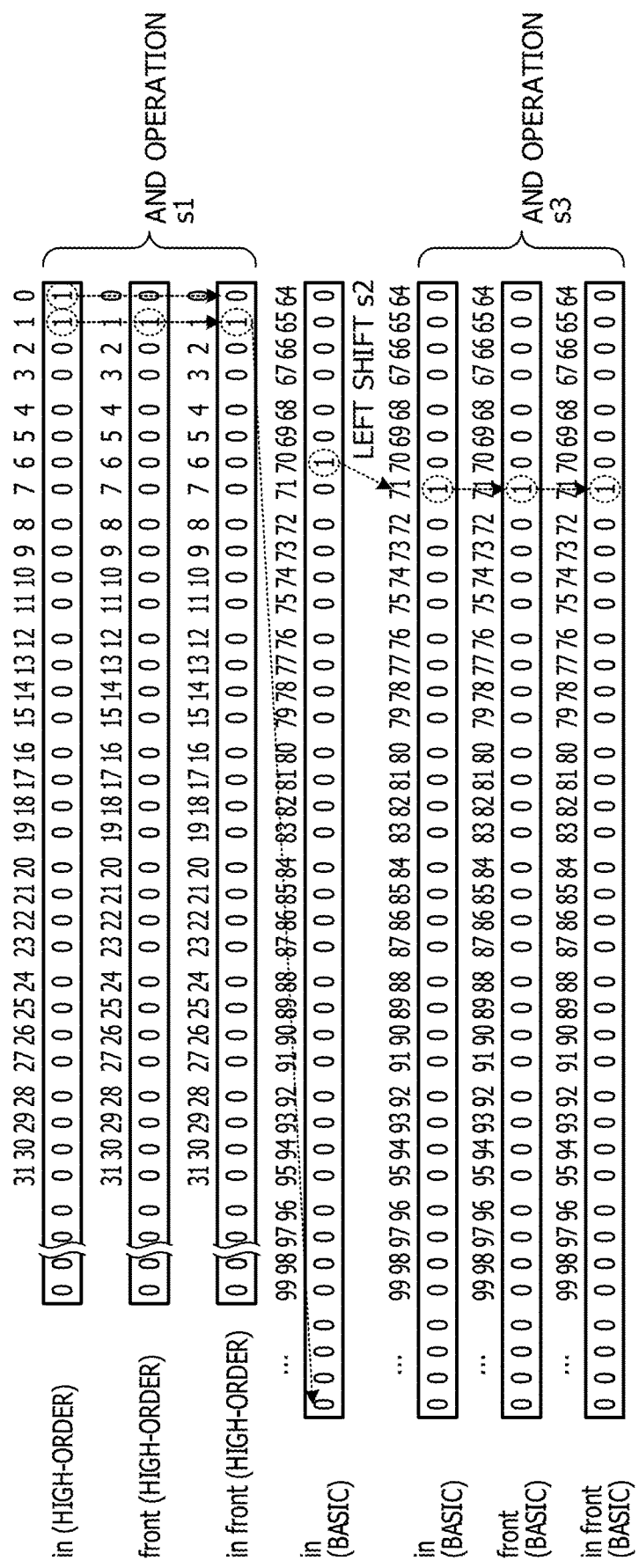
FIG. 3 is a diagram (2) illustrating an example of a flow of the encoding process according to the embodiment.
Figure 4:
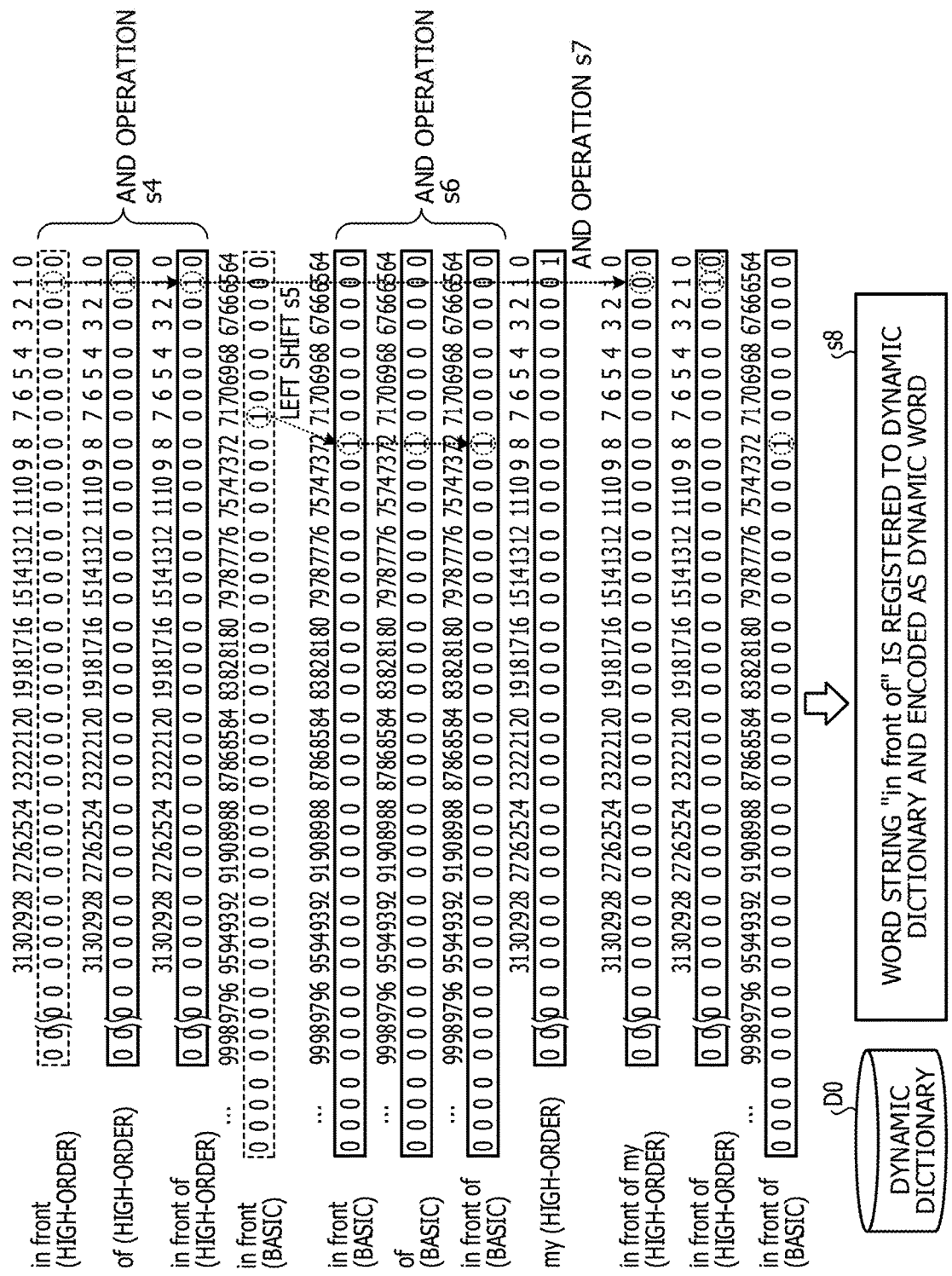
FIG. 4 is a diagram (3) illustrating an example of a flow of the encoding process according to the embodiment.

FIGS. 2 to 4 are diagrams illustrating an example of a flow of the encoding process according to the embodiment. As illustrated in FIGS. 2 to 4, the encoding device generates first index information with an appearance position in text data F1 as an axis for each character or word of the text data F1 to be encoded, and at the same time, the encoding device generates second index information in which the axis is upgraded. Index information including the first index information and the second index information is referred to as a "bitmap index" and is represented by a symbol BI. The term "character" as used herein means, for example, a CJK character. The term "word" as used herein means, for example, an English word. Although the case where the text data F1 is formed of words will be described below, the present embodiment is not limited thereto, and the text data F1 may be formed of characters.

Here, the bitmap index BI will be described. The bitmap index BI includes a basic bitmap and a high-order layer bitmap.

The basic bitmap is information of an index of a word (including a word string) included in the text data F1 to be encoded, with the offset (appearance position) within the text data F1 as an axis. That is, the basic bitmap refers to a bit string obtained by concatenating bits indicating the presence or absence of each offset (appearance position) in the text data F1 with respect to the word or the word string included in the text data F1 to be encoded.

The high-order layer bitmap is information of an index obtained by upgrading the axis of the basic bitmap. That is, the high-order layer bitmap is a bit string obtained by concatenating a bit indicating the presence or absence of each offset (appearance position) in the case where partial data in the text data F1 is set as an offset unit for the word or word string included in the text data F1 to be encoded. If the word or word string appears at any position in the partial data, a bit indicating existence is set. For example, the high-order layer bitmap is a bitmap of a high-order layer of the basic bitmap, in which consecutive predetermined bits of the basic bitmap are aggregated into one bit as the partial data as a unit of the offset. The predetermined bit (corresponds to aggregation rate of bitmap) may be, for example, 64 bits or a multiple of 64 bits. However, the predetermined bit may be a bit number matching the capacity of the register of a central processing unit (CPU). In addition, the predetermined bit may be the number of bits corresponding to the size of the text data F1. Hereinafter, a case where it is assumed that the predetermined bit is 64 bits will be described.

As an example, in a case where the word or the word string exists at a certain appearance position in the text data F1, ON as the existence and nonexistence of an offset (appearance position) corresponding to a certain appearance position, that is, an appearance bit indicating a binary "1" is set. In a case where the word or the word string does not exist at a certain appearance position in the text data F1, OFF as the existence and nonexistence of the offset (appearance position) corresponding to a certain appearance position, that is, a binary number "0" is set. In a case where the word or the word string exists in certain partial data in the text data F1, ON as existence and nonexistence of an offset (appearance position) corresponding to certain partial data, that is, an appearance bit indicating a binary number "1" is set. In a case where the word or the word string does not exist in certain partial data in the text data F1, OFF as existence and nonexistence of an offset (appearance position) corresponding to certain partial data, that is, an appearance bit indicating a binary number "0" is set. As a pointer designating the word or the word string, for example, a word ID of the word or the word string is adopted. The word ID may be the word or the word string itself, or may be the word or the code of the word string. The word or the code of the word string refers to an encoded code (encoded code) and corresponds to a static code and a dynamic code to be described later.

As illustrated in FIG. 2, an X axis of the bitmap index BI represents an offset (appearance position), and a Y axis represents the word ID. That is, each bitmap included in the bitmap index BI represents the presence or absence of each offset (appearance position) of the word or word string indicated by the word ID.

Here, a case where the appearance bit is set in a bitmap index BI will be described by focusing on the word "in" in the text data F1 to be encoded. Since the word "in" appears at the 10-th position of the text data F1, ON, that is, an appearance bit indicating a binary "1" is set in the 10-th bit appearance position of the basic bitmap corresponding to the word "in". In addition, since the word "in" appears at the 10-th position of the text data F1, ON, that is, an appearance bit indicating a binary "1" is set in the 0-th bit appearance position of the high-order layer bitmap. Since the word "in" appears at the 70-th position of the text data F1, ON, that is, the appearance bit indicating a binary "1" is set in the 70-th bit appearance position of the basic bitmap corresponding to the word "in". In addition, since the word "in" appears at the 70-th position of the text data F1, ON, that is, the appearance bit indicating a binary "1" is set in the 1-st appearance position of the high-order layer bitmap. Since the word "in" appears at the m-th position of the text data F1, ON, that is, the appearance bit indicating a binary "1" is set in the m-th bit appearance position of the basic bitmap corresponding to the word "in". In addition, since the word "in" appears at the m-th position of the text data F1, ON, that is, the appearance bit indicating a binary "1" is set in an n-th bit appearance position of the high-order layer bitmap. n is a value indicating the quotient when m is divided by 64.

The encoding device extracts a partial region of the basic bitmap which is a candidate target of the longest match search using such a high-order layer bitmap and performs encoding on the extracted partial region based on the longest match search. Here, a longest match search process to be performed from "in" appearing at the m-th position in the text data F1 will be described with reference to FIGS. 3 and 4.

As illustrated in FIG. 3, the encoding device extracts the high-order layer bitmap for the current word "in" appearing at the m-th position in the text data F1 from the bitmap index BI. The encoding device extracts the high-order layer bitmap for the next word "front" appearing at the (m+1)-th position in the text data F1 from the bitmap index BI. The encoding device performs an AND operation on the high-order layer bitmap for the current word "in" and the high-order layer bitmap for the next word "front" (s1). The encoding device determines whether the appearance bit is set in the high-order layer bitmap corresponding to "in front" which is obtained as a result of the operation. Here, the appearance bit is set in the 1-st bit of the high-order layer bitmap. That is, for the word string "in front" including the current word and the next word, the encoding device specifies that the partial candidate for the longest match search exists in the partial region of the basic bitmap corresponding to the appearance bit.

For the current word "in", the encoding device extracts a partial region of the basic bitmap corresponding to the 1-st bit of the high-order layer bitmap from the bitmap index BI. The encoding device shifts the extracted partial region to the left by 1 bit (s2). Here, "1" is set in the 71-st bit of the basic bitmap.

For the next word "front", the encoding device extracts the partial region of the basic bitmap corresponding to the 1-st bit of the high-order layer bitmap from the bitmap index BI. The encoding device performs the AND operation on the partial region of the basic bitmap for the current word "in" and the partial region of the basic bitmap for the next word "front" (s3). As a result of the operation, the encoding device determines whether all the bits of the partial region of the basic bitmap for "in front" are "0". In this case, since the 71-st bit is calculated as "1", it is difficult to consider that all the bits are "0". That is, the encoding device determines that the word string "in front" matches the encoded word or word string.

As illustrated in FIG. 4, the encoding device extracts the high-order layer bitmap for the next word "of" appearing at the (m+2)-th position in the text data F1 from the bitmap index BI. The encoding device performs the AND operation on the high-order layer bitmap for the current word string "in front" and the high-order layer bitmap for the next word "of" (s4). The encoding device determines whether the appearance bit is set in the high-order layer bitmap corresponding to "in front of" which is obtained as a result of the operation. Here, the appearance bit is set in the 1-st bit of the high-order layer bitmap. That is, for the word string "in front of" including the current word string and the next word, the encoding device specifies that the partial candidate for the longest match search exists in the partial region of the basic bitmap corresponding to the appearance bit.

Then, for the current word string "in front", the encoding device shifts the partial region of the basic bitmap corresponding to the 1-st bit of the high-order layer bitmap to the left by 1 bit (s5). Here, "1" is set in the 72-nd bit of the basic bitmap.

For the next word "of", the encoding device extracts the partial region of the basic bitmap corresponding to the 1-st bit of the high-order layer bitmap from the bitmap index BI. The encoding device performs the AND operation on the partial region of the basic bitmap for the current word string "in front" and the partial region of the basic bitmap for the next word "of" (s6). As a result of the operation, the encoding device determines whether all the bits of the partial region of the basic bitmap for "in front of" are "0". In this case, since the 72-nd bit is calculated as "1", it is difficult to consider that all the bits are "0". That is, the encoding device determines that the word string "in front of" matches the encoded word or word string.

The encoding device extracts the high-order layer bitmap for the next word "my" appearing at the (m+3)-th position in the text data F1 from the bitmap index BI. The encoding device performs the AND operation on the high-order layer bitmap for the current word string "in front of" and the high-order layer bitmap for the next word "my" (s7). The encoding device determines whether the appearance bit is set in the high-order layer bitmap corresponding to "in front of my" which is obtained as a result of the operation. Here, the appearance bit is set in the high-order layer bitmap. That is, for the word string "in front of my" including the current word string and the next word, the encoding device specifies that there is no candidate target for the longest match search. That is, the current word string "in front" of becomes the longest matching word string.

If the current word string "in front of" is not registered in a dynamic dictionary D0, the encoding device registers the word string "in front of" in the dynamic dictionary D0 and encodes the current word string as a dynamic word (s8). The encoding device outputs the encoded dynamic code as an encoded code. If the current word string is registered in the dynamic dictionary D0, the encoding device outputs the registered dynamic code as an encoded code. The encoding device sets an appearance bit at the appearance position of the word indicated by the word ID of the high-order layer bitmap and the basic bitmap for the word ID with the dynamic code as the word ID. That is, the encoding device sets the appearance bits in the appearance positions of the high-order layer bitmap and the basic bitmap for the word string "in front of".

The encoding device outputs the outputted encoded code to the encoded data of the encoded file.

The dynamic dictionary D0 here is a dictionary in which a word or a word string which are not registered in a static dictionary are associated with dynamically attached dynamic codes. The term "word string" as used herein refers to concatenated words to be concatenated and refers to words having features repeatedly appearing in the text data F1 to be encoded. For words that are not registered in the static dictionary, as an example, the words with low frequency of appearance (low frequency words) may be used. The word (low frequency word) as used herein includes a special word, a new word, an unknown word, and the like. The special word is a word that is valid between certain academic disciplines and industries, and has a feature repeatedly appearing in a document to be encoded. The new word is a newly created word such as a buzzword or the like and refers to a word having features repeatedly appearing in the document to be encoded. The unknown word is not a special word, but a word that is not a new word, and refers to a word having features repeatedly appearing in the document to be encoded. In the dynamic dictionary D0, the words associated with dynamic codes are registered in a buffer unit in the appearance order of a word or a word string which are not registered in the static dictionary. A detailed description of the dynamic dictionary D0 will be given later.

The term "static dictionary" as used herein refers to a dictionary in which an appearance frequency of words appearing in the document is specified based on a general English dictionary, Japanese dictionary, textbook, or the like, and to which shorter codes are allocated to the words whit higher frequency of appearance. In the static dictionary, static codes which are codes corresponding to each word are registered in advance.

Example of Dynamic Dictionary

Figure 5:
FIG. 5 is a diagram illustrating an example of a dynamic dictionary according to the embodiment.

FIG. 5 is a diagram illustrating an example of the dynamic dictionary according to the embodiment. The dynamic dictionary D0 illustrated in FIG. 5 includes a buffer unit D1 and an address table D2. The buffer unit D1 stores the word string. In the address table D2 the dynamic code, the storage position, and the data length are saved in association with each other. The dynamic code is a code with a predetermined fixed length, for example, a compressed code. The dynamic code is assigned in the order in which the word or the word string are registered. Here, the dynamic code is a fixed length two-byte code starting from hexadecimal "A". The storage position indicates the position of the word string stored in the buffer unit D1. The data length indicates the length (byte length) of the word string stored in the buffer unit D1.

For example, a case where the dynamic code is assigned to the word string "in front of Δ" will be described. In addition, "Δ" means blank. The encoding device stores the word string "in front of Δ" in the buffer unit D1. The encoding device registers the storage position storing the word string and the stored data length in the address table D2. Here, the encoding device registers "16" as the storage position and "12" as the data length in the address table D2. The encoding device assigns the dynamic code of the address table D2 which is associated with the word string as the encoded code. Here, the encoding device assigns the dynamic code "A002$_h$" associated with the word string "in front of Δ" as the encoded code.

Configuration Example of Encoded File

Figure 6:
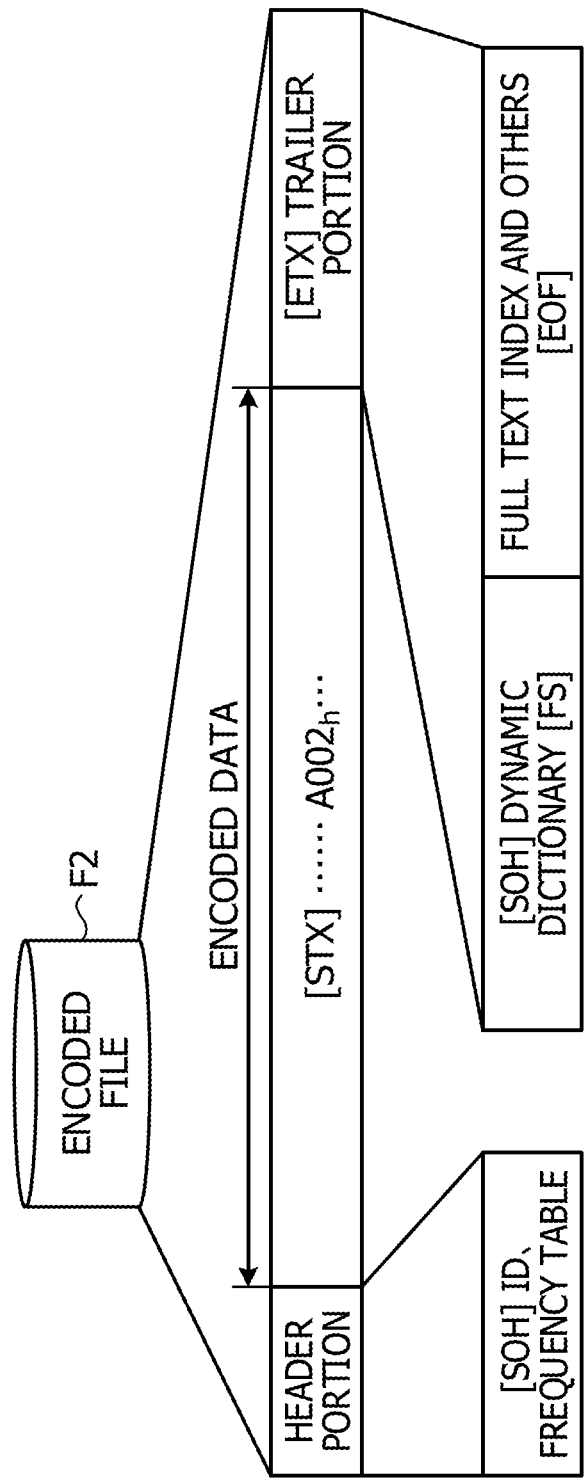
FIG. 6 is a diagram illustrating a configuration example of an encoded file according to the embodiment.

FIG. 6 is a diagram illustrating a configuration example of an encoded file according to the embodiment. As illustrated in FIG. 6, an encoded file F2 includes a header portion, encoded data, and a trailer portion. The encoded data stores the encoded code group of the text data F1. In the trailer portion, the information of the dynamic dictionary D0 and the bitmap index BI in which the encoding process is completed are stored. The information of the dynamic dictionary D0 corresponds to the information of the dynamic dictionary illustrated in FIG. 5. The header portion stores, for example, information for identifying an encoding algorithm used for generating the encoded file F2 or information such as parameters used for encoding. For example, a pointer to the dynamic dictionary D0 stored in the trailer portion or the like is stored in the header portion. It is described that the trailer portion stores the bitmap index BI. However, it may be a case where the trailer portion does not store the bitmap index BI.

Configuration of Encoding Device According to Embodiment

Figure 7:
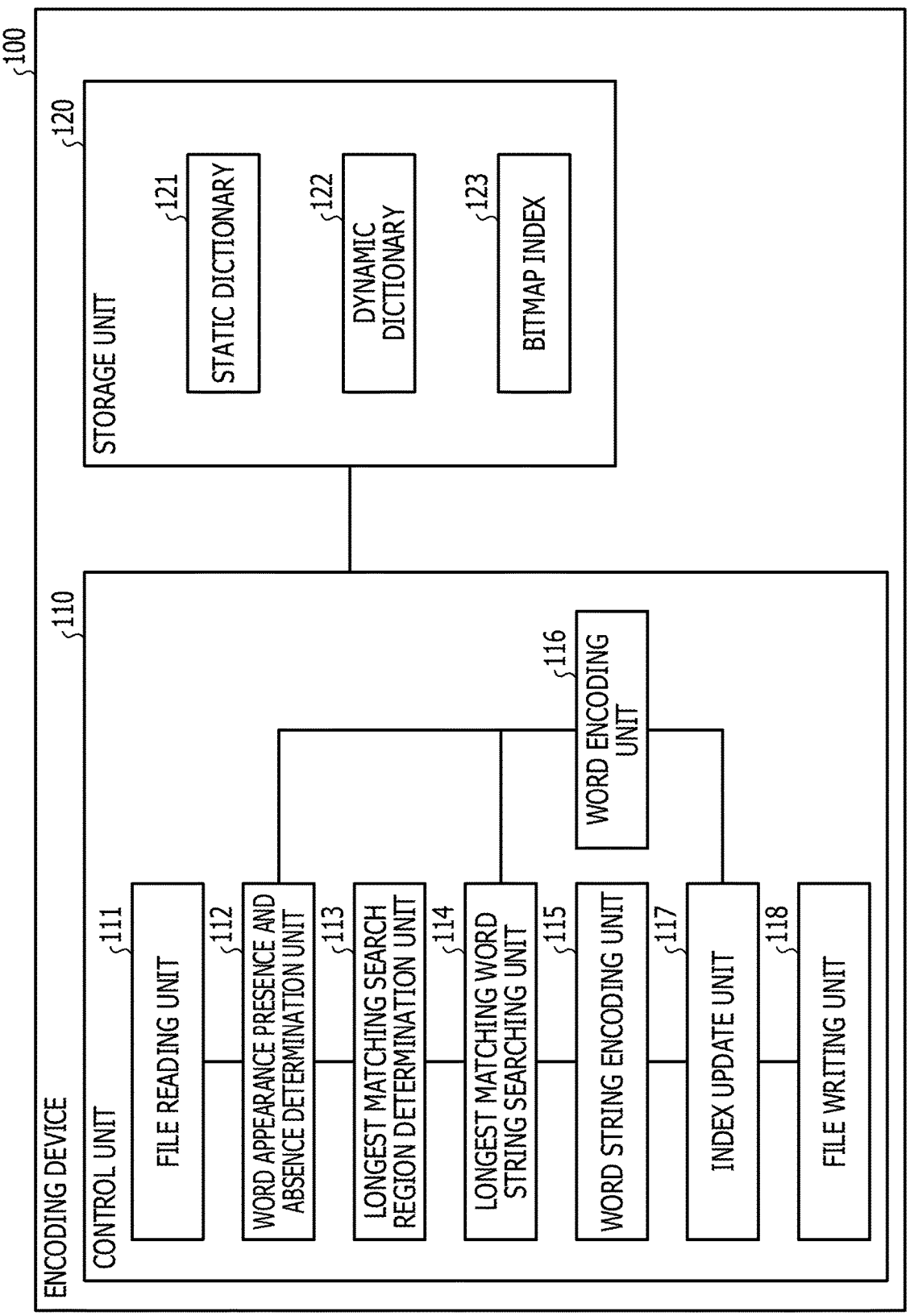
FIG. 7 is a functional block diagram illustrating an example of a configuration of an encoding device according to the embodiment.

FIG. 7 is a functional block diagram illustrating an example of a configuration of an encoding device according to the embodiment. As illustrated in FIG. 7, an encoding device 100 includes a control unit 110 and a storage unit 120.

The control unit 110 is a processing unit that executes the encoding process illustrated in FIGS. 2 to 4. The control unit 110 includes a file reading unit 111, a word appearance presence and absence determination unit 112, a longest matching search region determination unit 113, a longest matching word string searching unit 114, a word string encoding unit 115, a word encoding unit 116, an index update unit 117, and a file writing unit 118. The file reading unit 111 is an example of a reading unit. The longest matching search region determination unit 113 is an example of a specifying unit. The longest matching word string searching unit 114, the word string encoding unit 115, and the word encoding unit 116 are examples of an encoding unit. The index update unit 117 is an example of a first generating unit and a second generating unit.

The storage unit 120 corresponds to a storage device such as a nonvolatile semiconductor memory device such as a flash memory or a ferroelectric random access memory (FRAM (registered trademark)). The storage unit 120 includes a static dictionary 121, a dynamic dictionary 122, and a bitmap index 123.

The static dictionary 121 is a dictionary in which an appearance frequency of words appearing in the document is specified based on a general English dictionary, Japanese dictionary, textbook, or the like, and to which shorter codes are allocated to the words whit higher frequency of appearance. In the static dictionary 121, static codes which are codes corresponding to each word are registered in advance.

The dynamic dictionary 122 is a dictionary in which a word or a word string which are not registered in the static dictionary 121 are associated with dynamically attached dynamic codes. The dynamic dictionary 122 corresponds to the dynamic dictionary D0. Since the description of the dynamic dictionary 122 is similar to that of FIG. 5, the description will be omitted.

The bitmap index 123 is a set of bitmaps in which the presence or absence of each offset (appearance position) is indexed for the word or the word string included in the text data F1. The bitmap index 123 has a basic bitmap and a high-order layer bitmap. The bitmap index 123 corresponds to the bitmap index BI. Since the description of the bitmap index 123 is similar to that of FIG. 2, its description will be omitted.

The file reading unit 111 reads the file to be encoded in the storage region. The file reading unit 111 reads the text data F1 from the storage region and performs lexical analysis on the read text data F1. The file reading unit 111 sequentially outputs words which are subjected to lexical analysis to the word appearance presence and absence determination unit 112.

The word appearance presence and absence determination unit 112 determines the appearance presence or absence of the word by using the high-order layer bitmap for the word. For example, the word appearance presence and absence determination unit 112 extracts a high-order layer bitmap corresponding to the word ID corresponding to the word which is subjected to lexical analysis from the bitmap index 123. The word appearance presence and absence determination unit 112 determines whether the appearance bit is set in the extracted high-order layer bitmap. In a case where the appearance bit is not set in the extracted high-order layer bitmap, the word appearance presence and absence determination unit 112 outputs the word which is processed this time to the word encoding unit 116. In a case where the appearance bit is set in the extracted high-order layer bitmap, the word appearance presence and absence determination unit 112 outputs the word processed this time to the longest matching search region determination unit 113.

The longest matching search region determination unit 113 specifies a partial region to be the candidate target for the longest match search using the high-order layer bitmap for the word or the word string. For example, the longest matching search region determination unit 113 performs the AND operation on the high-order layer bitmap for the word or word string processed this time and the high-order layer bitmap for the word to be processed next time. The longest matching search region determination unit 113 determines whether the appearance bit is set in the high-order layer bitmap corresponding to the word string obtained as a result of the operation. In a case where the appearance bit is set, the longest matching search region determination unit 113 specifies the partial region of the basic bitmap corresponding to the appearance bit from the bitmap index 123. As an example, the longest matching search region determination unit 113 specifies which 64-bit partial region is.

The longest matching word string searching unit 114 searches for the longest matching word string using the basic bitmap with respect to the partial region specified by the longest matching search region determination unit 113. For example, the longest matching word string searching unit 114 shifts the partial region of the word or word string processed this time to the left. The longest matching word string searching unit 114 performs the AND operation on the left shifted partial region and the partial region of the word to be processed next time. The longest matching word string searching unit 114 determines whether all the bits of the partial region corresponding to the word string obtained as a result of the operation are "0". In the case where it is difficult to consider that all the bits are "0", the longest matching word string searching unit 114 determines that the word string including the word or the word string processed this time and the word to be processed next time matches the encoded word or word string. Then, the longest matching word string searching unit 114 further performs processing the word or the word string processed this time or the word or the word string to be processed next time by the longest matching search region determination unit 113 and the longest matching word string searching unit 114. In a case where all the bits are "0", the longest matching word string searching unit 114 determines the word or the word string processed this time or the word or the word string to be processed next time is not identical to the encoded word or word string. As a result, in a case where the word or word string processed this time is a word string, the word string is the longest matching word string. In a case where the word or word string processed this time is a word string, the longest matching word string searching unit 114 outputs the word string (longest matching word string) to the word string encoding unit 115. In a case where the word or word string processed this time is a word, the longest matching word string searching unit 114 outputs the word to the word encoding unit 116. In a case where there is a plurality of specified partial regions, the longest matching word string searching unit 114 may execute the specified partial regions.

The word string encoding unit 115 encodes the longest matching word string. For example, the word string encoding unit 115 determines whether the longest matching word string is registered in the dynamic dictionary 122. In a case where the longest matching word string is not registered in the dynamic dictionary 122, the word string encoding unit 115 registers the word string in the dynamic dictionary 122 and assigns a dynamic code to this word string. As an example, the word string encoding unit 115 stores the longest matching word string in the buffer unit D1 and stores the storage position in which the word string is stored and the stored data length in the record corresponding to a new dynamic code of the address table D2. The word string encoding unit 115 encodes this word string into a new dynamic code. In a case where the longest matching word string is registered in the dynamic dictionary 122, the word string encoding unit 115 encodes the word string into the registered dynamic code. The word string encoding unit 115 outputs the encoded dynamic code and the appearance position in the text data F1 to the index update unit 117.

The word encoding unit 116 encodes the words. For example, the word encoding unit 116 encodes the word output from the word appearance presence and absence determination unit 112 or the longest matching word string searching unit 114 into a static code registered in the static dictionary 121. The word encoding unit 116 outputs the encoded static code and the appearance position in the text data F1 to the index update unit 117.

The index update unit 117 updates the bitmap index 123. For example, the index update unit 117 updates the basic bitmap and the high-order layer bitmap for the dynamic code using the dynamic code output from the word string encoding unit 115 and the appearance position in the text data F1. The index update unit 117 updates the basic bitmap and the high-order layer bitmap for the static code using the static code output from the word encoding unit 116 and the appearance position in the text data F1.

The file writing unit 118 encodes all of the text data F1 in the file to be encoded and then stores the respective encoded codes in the encoded data of the encoded file F2. The file writing unit 118 writes the information of the dynamic dictionary 122 and the bitmap index 123 into the trailer portion of the encoded file F2.

Processing Procedure of Encoding Process According to Embodiment

Figure 8A:
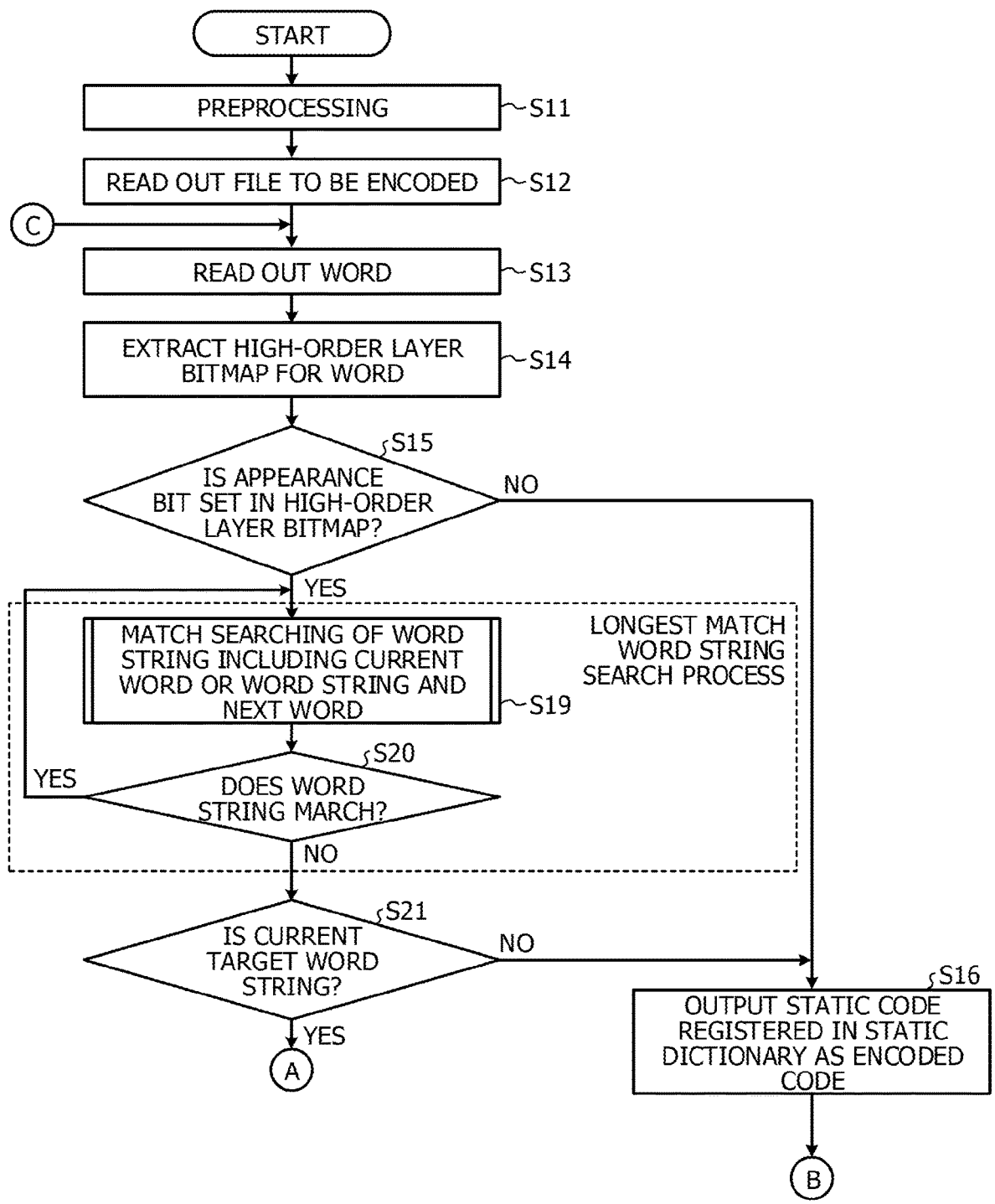
FIGS. 8A and 8B are diagrams illustrating an example of a flowchart of the encoding process according to the embodiment.
Figure 8B:
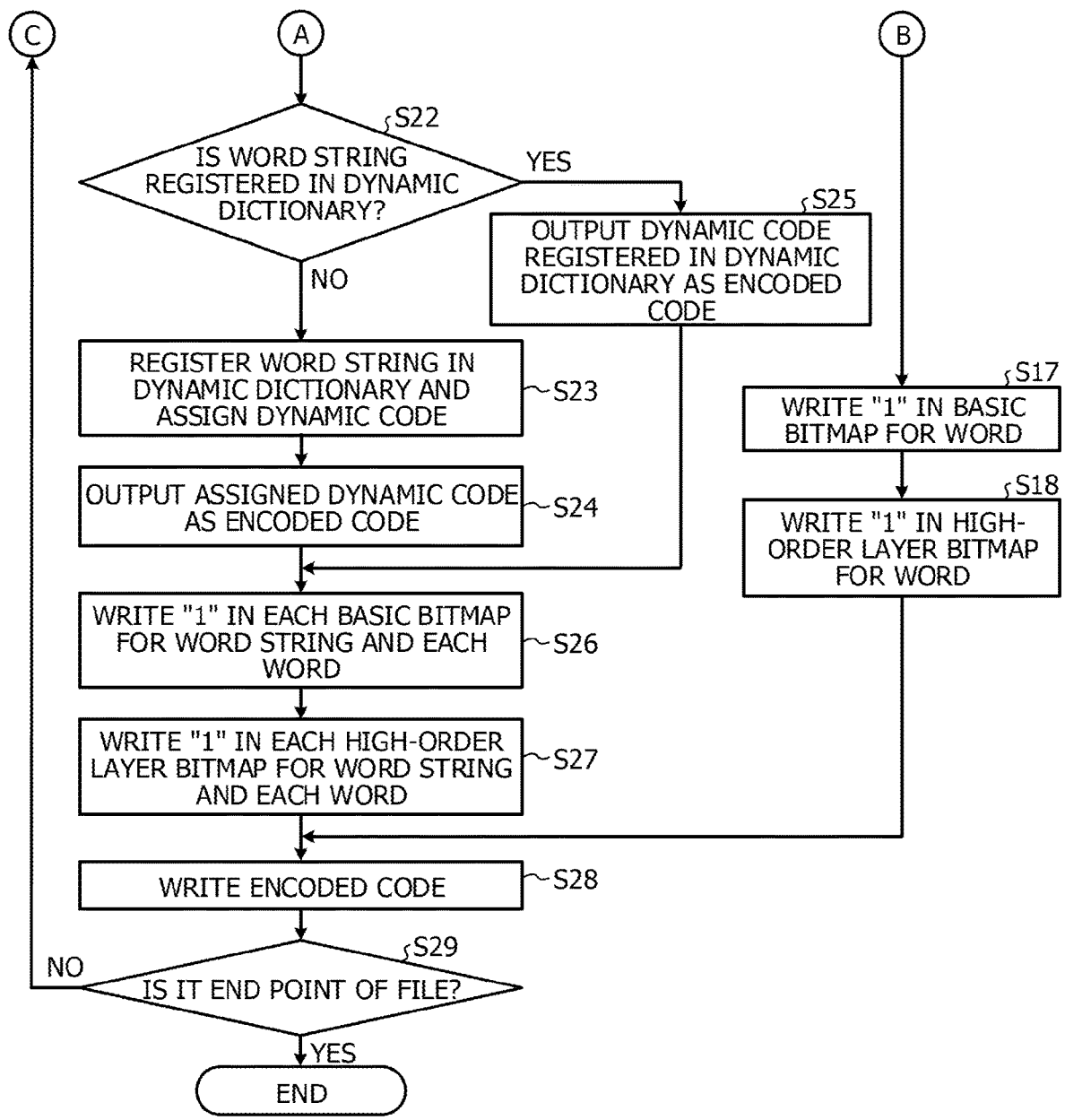

Next, the processing procedure of the control unit 110 illustrated in FIG. 7 will be described with reference to FIGS. 8A and 8B. FIGS. 8A and 8B are diagrams illustrating an example of a flowchart of the encoding process according to the embodiment.

As illustrated in FIGS. 8A and 8B, the control unit 110 executes preprocessing (Step S11). For example, the control unit 110 saves various types of storage regions in the storage unit 120. The control unit 110 reads out the file to be encoded and stores the text data F1 in the storage region for reading (Step S12).

The control unit 110 reads out a word from the storage region for reading (Step S13). The control unit 110 extracts the high-order layer bitmap for the read word from the bitmap index 123 (Step S14). For example, the control unit 110 acquires a static code for the word from the static dictionary 121 as the word ID. The control unit 110 extracts the high-order layer bitmap for the word ID from the bitmap index 123.

The control unit 110 determines whether the appearance bit is set in the high-order layer bitmap for the word (Step S15). In a case where it is determined that the appearance bit is not set in the high-order layer bitmap for the word (Step S15; No), the control unit 110 outputs the static code registered in the static dictionary 121 as an encoded code (Step S16). The control unit 110 writes "1" (appearance bit) at the appearance position of the basic bitmap for the word using the static code of the word and the appearance position in the text data F1, (Step S17). Furthermore, the control unit 110 writes "1" (appearance bit) at the upper appearance position of the high-order layer bitmap for the word using the static code of the word and the appearance position in the text data F1 (Step S18). The control unit 110 proceeds to Step S28.

On the other hand, in a case where it is determined that the appearance bit is set in the high-order layer bitmap for the word (Step S15; Yes), the control unit 110 executes a match word string search process of a word string including a current target (word or word string) and the word to be processed next time (Step S19). The flowchart of the match word string search process will be described later.

As a result of executing the match search, the control unit 110 determines whether the word string match (Step S20). In a case where it is determined that the word string match (Step S20; Yes), the control unit 110 proceeds to Step S19 so as to execute a match search for the word string including the next word.

On the other hand, in a case where it is determined that the word string do not match (Step S20; No), the control unit 110 determines whether the current target (the word or the word string) is a word string (Step S21). If it is determined that the current target is not a word string (Step S21; No), the control unit 110 proceeds to Step S16 so as to encode the current target as a static code.

On the other hand, in a case where it is determined that the current target is the word string (Step S21; Yes), the control unit 110 determines whether the word string is registered in the dynamic dictionary 122 (Step S22). In a case where it is determined that the word string is not registered in the dynamic dictionary 122 (Step S22; No), the control unit 110 registers the word string in the dynamic dictionary 122 and assigns the dynamic code to the word string (Step S23). The control unit 110 outputs the assigned dynamic code as the encoded code (Step S24). Then, the control unit 110 proceeds to Step S26.

On the other hand, in a case where it is determined that the word string is registered in the dynamic dictionary 122 (Step S22; Yes), the control unit 110 outputs the dynamic code registered in the dynamic dictionary 122 as the encoded code (Step S25). The control unit 110 proceeds to Step S26.

In Step S26, the control unit 110 writes "1" in each basic bitmap for the word string and each word (Step S26). For example, the control unit 110 writes "1" (appearance bit) in the appearance position of the basic bitmap for the word string using the dynamic code and the appearance position in the text data F1 for the word string. The control unit 110 writes "1" (appearance bit) in the appearance position of the basic bitmap for each word using the static code and the appearance position in the text data F1 for each word used for executing the longest match word string search.

Further, the control unit 110 writes "1" in each high-order layer bitmap for the word string and each word (Step S27). For example, the control unit 110 writes "1" (appearance bit) in the appearance position of the high-order layer bitmap for the word string using the dynamic code and the appearance position in the text data F1 for the word string. The control unit 110 writes "1" (appearance bit) in the appearance position of the high-order layer bitmap for each word using the static code and the appearance position in the text data F1 for each word used when searching the longest match word string. The control unit 110 proceeds to Step S28.

In Step S28, the control unit 110 writes the encoded code in the encoded data of the encoded file F2 (Step S28). The control unit 110 determines whether it is the end point of the file (Step S29). If it is determined that it is not the end point of the file (Step S29; No), the control unit 110 proceeds to Step S13 so as to read the next word.

On the other hand, in a case where it is determined that it is the end point of the file (Step S29; Yes), the control unit 110 ends the encoding process.

Processing Procedure of Word String Match Search Process According to the Embodiment.

Figure 9:
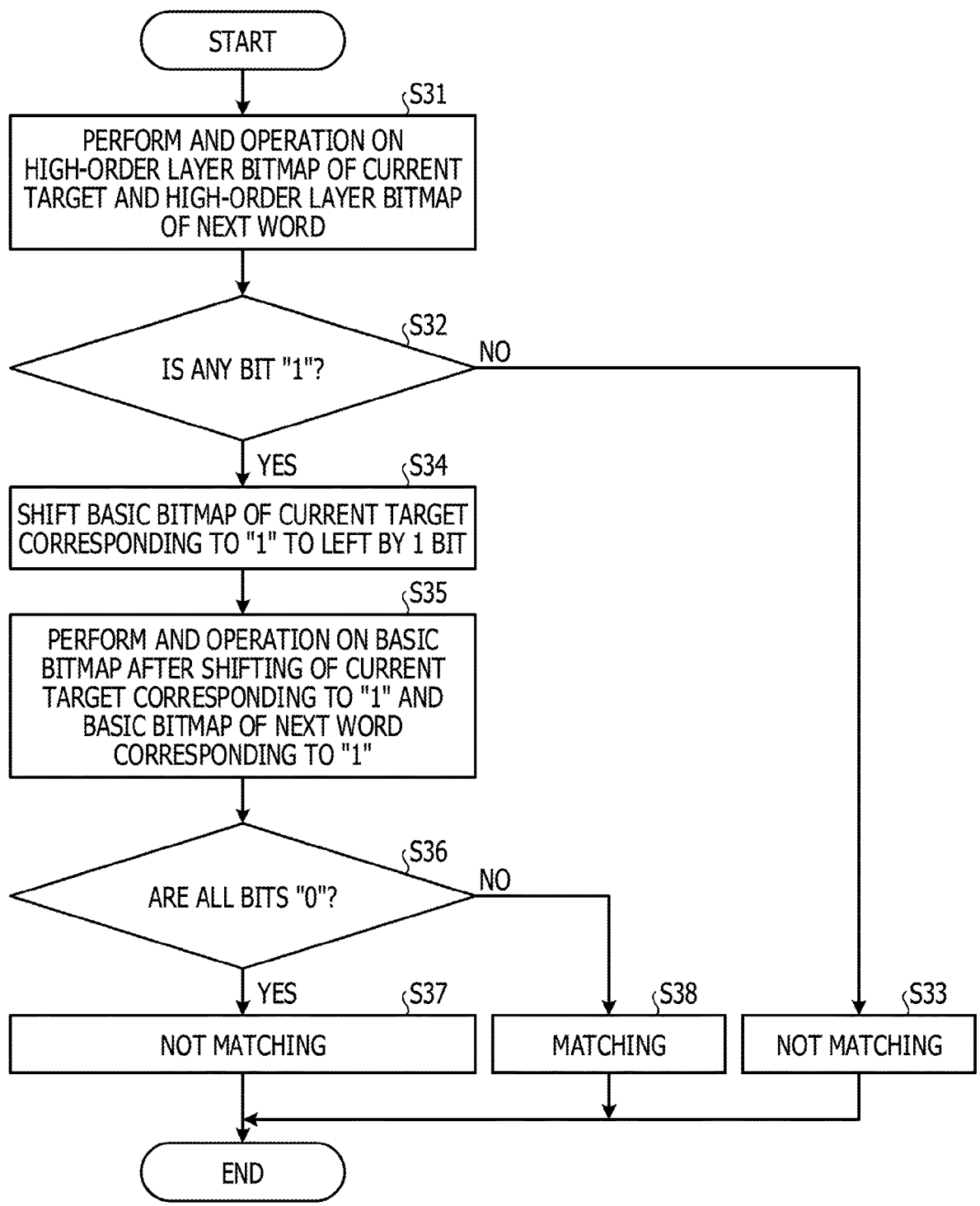
FIG. 9 is a diagram illustrating an example of a flowchart of a match word string search process according to the embodiment.

FIG. 9 is a diagram illustrating an example of a flowchart of a match word string search process according to the embodiment.

As illustrated in FIG. 9, the control unit 110 performs the AND operation on the high-order layer bitmap for the current target (the word or the word string) and the high-order layer bitmap for the next word (Step S31). The control unit 110 determines whether any bit of the high-order layer bitmap indicating the AND operation result is "1" (Step S32).

In a case where it is determined that any of the bits of the high-order layer bitmap indicating the result of the AND operation is "1" (Step S32; No), the control unit 110 determines that the word string including the current target and the next word do not match (Step S33). That is, the control unit 110 determines that the word string including the current target and the next word do not match the encoded word or word string. The control unit 110 ends the match search process of the word string.

On the other hand, in a case where it is determined that any bit of the high-order layer bitmap indicating the result of the AND operation is "1" (Step S32: Yes), the control unit 110 shifts the basic bitmap of the current target for "1" to the left by 1 bit (Step S34). For example, the control unit 110 extracts a partial region of the basic bitmap corresponding to "1" for the current target. The control unit 110 shifts the extracted partial region to the left by 1 bit.

The control unit 110 performs the AND operation on the basic bitmap after the shifting the current target corresponding to "1" and the basic bitmap of the next word corresponding to "1" (Step S35). For example, the control unit 110 extracts the partial region of the basic bitmap corresponding to "1" for the next word. The control unit 110 performs the AND operation on the partial region shifted for the current target and the partial region extracted for the next word.

As a result of the AND operation, the control unit 110 determines whether all the bits are "0" (Step S36). In a case where it is determined that all the bits are "0" (Step S36: Yes), the control unit 110 determines that the word string including the current target and the next word do not match (Step S37). That is, the control unit 110 determines that the word string including the current target and the next word does not match the encoded word or word string. The control unit 110 ends the word string match search process.

On the other hand, in a case where it is determined that it is difficult to consider that all the bits are "0" (Step S36; No), the control unit 110 determines that the word string including the current target and the next word matches (Step S38). That is, the control unit 110 determines that the word string including the current target and the next word matches the encoded word or word string. The control unit 110 ends the match word string search process.

Accordingly, the encoding device 100 reads out the text data F1 to be encoded. The encoding device 100 generates the bitmap index 123 of the basic bitmap having the appearance position in the text data F1 as the first axis for each character or word obtained based on the lexical analysis of the text data F1. The encoding device 100 generates the bitmap index 123 of a high-order layer bitmap obtained by upgrading the first axis with respect to each character or word. The encoding device 100 specifies a sub-region in the bitmap index 123 of the basic bitmap to be a candidate target for the longest match search using the bitmap index 123 of the high-order layer bitmap. The encoding device 100 performs encoding based on the longest match search in each of the sub-regions in the bitmap index 123 of the specified basic bitmap. According to such a configuration, the encoding device 100 can efficiently encode the character string or the word string using the longest match search. That is, since the encoding device 100 does not have a restriction of limiting the size of the longest match target to a certain value or less in the longest match search, it is possible to improve the encoding rate and efficiently perform encoding. In addition, since the encoding device 100 does not collate with the actual data in the longest match search, the encoding speed can be improved and encoding can be efficiently performed.

In addition, the encoding device 100 generates the bitmap index 123 of the high-order layer bitmap by upgrading the first axis according to the size of the text data F1 to be encoded. According to such a configuration, by upgrading the first axis according to the size of the text data F1 to be encoded, the encoding device 100 maintains the granularity of the index with respect to the text data F1, and it is possible to suppress the amount of computation in the longest match search using the index in a predetermined manner.

In addition, the encoding device 100 does not compare consecutive characters or words for the sub-region in the specified bitmap index 123 of the basic bitmap with the text data F1 which is actual data, and the longest match search is performed by referring to the bitmap index 123 of the basic bitmap. According to such a configuration, since the encoding device 100 does not collate with the actual data, it is possible to improve the encoding speed and the encoding rate as compared with a scheme using the sliding window.

Another Aspect Relating to Embodiment

Hereinafter, a part of a modification example according to the above examples will be described. In addition to the following modification examples, design changes within the scope not departing from the gist of the present embodiments can be performed in a predetermined manner.

In addition, in the embodiment, the encoding device 100 generates the bitmap index 123 of the basic bitmap having the appearance position in the text data F1 as the first axis for each character or word obtained based on the lexical analysis of the text data F1. The encoding device 100 generates the bitmap index 123 of a high-order layer bitmap obtained by upgrading the first axis with respect to each character or word. The encoding device 100 specifies a sub-region to be a candidate target for the longest match search using the bitmap index 123 of the high-order layer bitmap and performs encoding based on the longest match search in each of the sub-regions. However, the encoding device 100 may generate a hashed hash index for each bitmap for each character or word instead of the bitmap index 123 including the basic bitmap and the high-order layer bitmap generated for each character or word. In the longest match search, the encoding device 100 may restore the hashed index for the corresponding character or word, use the restored basic bitmap and the high-order layer bitmap to specify the sub-region to be the candidate target of the longest match search, and perform encoding based on the longest match search in each of the sub-regions. As a result, the encoding device 100 can encode with fewer resources even in a case where there are few resources available for encoding at the time of encoding.

In addition, the processing procedures, the control procedures, the detailed names, and the information including various data items and parameters disclosed in the embodiment can be changed in a predetermined manner unless otherwise specified.

Hardware Configuration of Information Processing Apparatus

Figure 10:
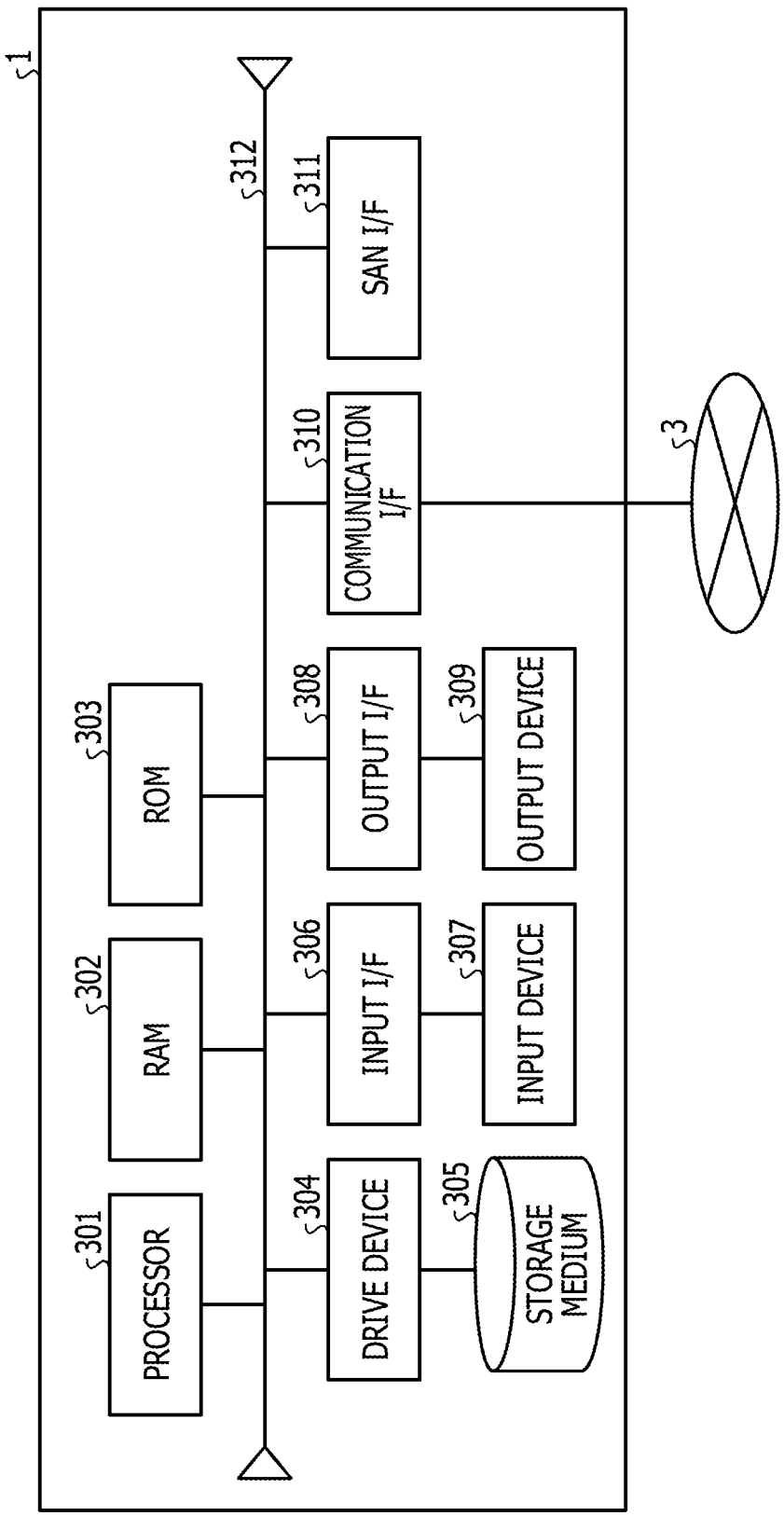
FIG. 10 is a diagram illustrating a hardware configuration example of a computer.

Hardware and software used in the above embodiments will be described below. FIG. 10 is a diagram illustrating a hardware configuration example of a computer 1. The computer 1 includes, for example, a processor 301, a random access memory (RAM) 302, a read only memory (ROM) 303, a drive device 304, a storage medium 305, an input interface (I/F) 306, an input device 307, an output interface (I/F) 308, an output device 309, a communication interface (I/F) 310, a storage area network (SAN) interface (I/F) 311, a bus 312, and the like. The respective hardware is connected via the bus 312.

The RAM 302 is a readable and writable memory device, for example, a semiconductor memory such as a static RAM (SRAM) or a dynamic ram (DRAM), a flash memory, or the like is used instead of the RAM. The ROM 303 also includes a programmable ROM (PROM) and the like. The drive device 304 is a device that performs at least one of reading and writing of information recorded on the storage medium 305. The storage medium 305 stores the information written by the drive device 304. The storage medium 305 is a storage medium such as a hard disk, a flash memory such as a solid state drive (SSD), a compact disc (CD), a digital versatile disc (DVD), a Blu-ray disc, or the like. In addition, the computer 1 includes the drive device 304 and the storage medium 305 for each of a plurality of types of storage media, for example.

The input interface 306 is connected to the input device 307 and is a circuit for transmitting an input signal received from the input device 307 to the processor 301. The output interface 308 is connected to the output device 309, and is a circuit that causes the output device 309 to execute output according to an instruction of the processor 301. The communication interface 310 is a circuit for controlling communication via a network 3. The communication interface 310 is, for example, a network interface card (NIC) or the like. The SAN interface 311 is a circuit for controlling communication with a storage device connected to the computer 1 via a storage area network. The SAN interface 311 is, for example, a host bus adapter (HBA) or the like.

The input device 307 is a device that transmits an input signal according to an operation. The input signal is, for example, a key device such as a keyboard or a button attached to the main body of the computer 1, or a pointing device such as a mouse or a touch panel. The output device 309 is a device that outputs information according to the control of the computer 1. The output device 309 is, for example, an image output device (display device) such as a display, an audio output device such as a speaker, or the like. In addition, for example, an input and output device such as a touch screen is used as the input device 307 and the output device 309. In addition, the input device 307 and the output device 309 may be integrated with the computer 1, or may not be included in the computer 1, and may be, for example, a device connected externally to the computer 1.

For example, the processor 301 reads the program stored in the ROM 303 and the storage medium 305 by the RAM 302, and performs the processing of the control unit 110 according to the procedure of the read program. At that time, the RAM 302 is used as a work area of the processor 301. The function of the storage unit 120 is obtained such that the ROM 303 and the storage medium 305 stores program files (for example, an application program 24, a middleware 23, an OS 22, and the like to be described later) or data files (for example, the static dictionary 121, the dynamic dictionary 122, the bitmap index 123, and the like) and the RAM 302 is used as a work area of the processor 301. A program read by the processor 301 will be described with reference to FIG. 11.

Figure 11:
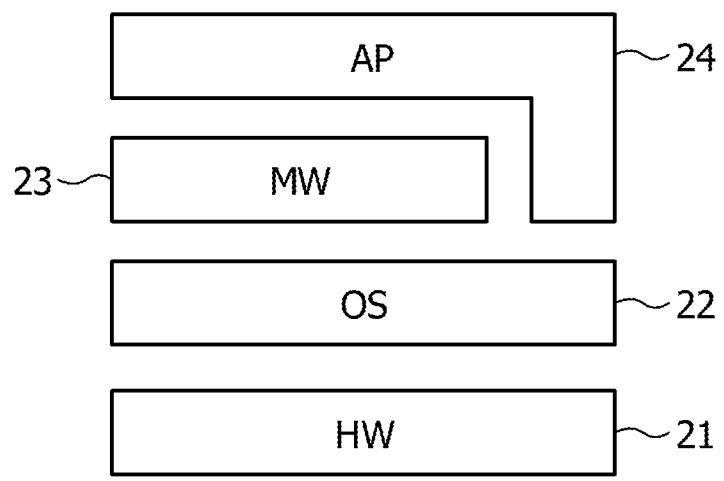
FIG. 11 is a diagram illustrating a configuration example of a program to be executed by the computer.

FIG. 11 is a diagram illustrating a configuration example of a program to be executed by the computer. In the computer 1, an operating system (OS) 22 for controlling a hardware group (HW) 21 (301 to 312) illustrated in FIG. 11 operates. The processor 301 is operated according to the procedure according to the OS 22, and the hardware group (HW) 21 is controlled and managed. Accordingly, processing according to the application program (AP) 24 and the middleware (MW) 23 is executed by the hardware group 21. Furthermore, in the computer 1, the middleware (MW) 23 or the application program (AP) 24 is read by the RAM 302 and executed by the processor 301.

In a case where the encoding function is invoked, the processor 301 performs processing based on at least a part of the middleware 23 or the application program 24 (by controlling the hardware group 21 based on the OS 22) to obtain the function of the control unit 110. The encoding function may be included in the application program 24 itself or may be a part of the middleware 23 to be executed by being invoked in accordance with the application program 24.

Figure 12:
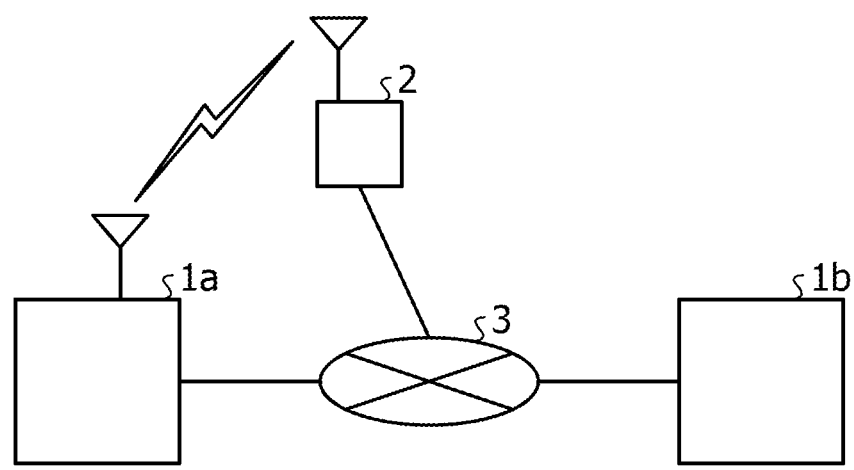
FIG. 12 is a diagram illustrating a configuration example of a device in a system of an embodiment.

FIG. 12 is a diagram illustrating a configuration example of the device in a system of the embodiment. The system of FIG. 12 includes a computer 1a, a computer 1b, a base station 2 and the network 3. The computer 1a is connected to the network 3 connected to the computer 1b by at least one of wireless and wired manners.

The encoding device 100 illustrated in FIG. 7 and the decoding device (not illustrated) may be included in either the computer 1a or the computer 1b illustrated in FIG. 12. The computer 1b may include the function of the encoding device 100, the computer 1a may include the function of the decoding device, the computer 1a may include the function of the encoding device 100, and the computer 1b may include the function of the decoding device. In addition, both the computer 1a and the computer 1b may have the function of the encoding device 100 and the function of the decoding device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable medium storing a program that causes a processor included in a computer to execute a process, the process comprising:
   obtaining text data;
   generating first bitmap information indicating appearance positions in the text data for each of a plurality of characters or words obtained based on lexical analysis of the text data;
   specifying a size of a capacity of a register of the processor;
   generating, from a plurality of bits of the first bitmap information, second bitmap information indicating a bitmap in which one or more bits related to the size of the capacity;
   when an appearance bit indicating appearance positions in the text data for each of the plurality of characters or words is set in the second bitmap information, specifying a data range corresponding to the appearance bit in the first bitmap information;
   searching a longest matching word string by using the data range in the first bitmap information;
   determining whether the longest matching word string is registered in a dynamic dictionary;
   when the longest matching word string is not registered in the dynamic dictionary, registering the longest matching word string in the dynamic dictionary and assigning a dynamic code to the longest matching word string as a registered dynamic code;
   when the longest matching word string is registered in the dynamic dictionary, encoding the longest matching word string into the registered dynamic code; and
   outputting the registered dynamic code and the appearance positions in the text data.

2. The non-transitory computer readable medium according to claim 1, wherein
   the pattern match search is a longest match search.

3. The non-transitory computer readable medium storing the encoding program according to claim 1, wherein
   an aggregation rate for the second bitmap information is determined based on a data size of the text data.

4. The non-transitory computer readable medium according to claim 1, wherein
   the encoding is performed without a pattern matching regarding consecutive characters or words corresponding to the data range in the first bitmap information with the text data which is actual data.

5. An encode method executed by a computer, the encode method comprising:
   obtaining text data;
   generating first bitmap information indicating appearance positions in the text data for each of a plurality of characters or words obtained based on lexical analysis of the text data;
   specifying a size of a capacity of a register of the processor;
   generating, from a plurality of bits of the first bitmap information, second bitmap information indicating a bitmap in which one or more bits related to the size of the capacity are aggregated into one bit;
   when an appearance bit indicating appearance positions in the text data for each of the plurality of characters or words is set in the second bitmap information, specifying a data range corresponding to the appearance bit in the first bitmap information;
   searching a longest matching word string by using the data range in the first bitmap information;
   determining whether the longest matching word string is registered in a dynamic dictionary;
   when the longest matching word string is not registered in the dynamic dictionary, registering the longest matching word string in the dynamic dictionary and assigning a dynamic code to the longest matching word string as a registered dynamic code;
   when the longest matching word string is registered in the dynamic dictionary, encoding the longest matching word string into the registered dynamic code; and outputting the registered dynamic code and the appearance positions in the text data.

6. An encode device comprising:
a memory; and
a processor coupled to the memory and the processor configured to execute a process, the process including:
   obtaining text data;
   generating first bitmap information indicating appearance positions in the text data for each of a plurality of characters or words obtained based on lexical analysis of the text data;
   specifying a size of a capacity of a register of the processor;
   generating, from a plurality of bits of the first bitmap information, second bitmap information indicating a bitmap in which one or more bits related to the size of the capacity are aggregated into one bit;
   when an appearance bit indicating appearance positions in the text data for each of the plurality of characters or words is set in the second bitmap information, specifying a data range corresponding to the appearance bit in the first bitmap information;
   searching a longest matching word string by using the data range in the first bitmap information;
      determining whether the longest matching word string is registered in a dynamic dictionary;
      when the longest matching word string is not registered in the dynamic dictionary, registering the longest matching word string in the dynamic dictionary and assigning a dynamic code to the longest matching word string as a registered dynamic code;
      when the longest matching word string is registered in the dynamic dictionary, encoding the longest matching word string into the registered dynamic code; and
   outputting the registered dynamic code and the appearance positions in the text data.

* * * * *